US012633301B2

(12) United States Patent
David Baptista De Souza et al.

(10) Patent No.: US 12,633,301 B2
(45) Date of Patent: May 19, 2026

(54) METHOD AND SYSTEM FOR PERFORMING DATA AUGMENTATION BASED ON MODIFIED SURROGATES, AND, NON-TRANSITORY COMPUTER READABLE MEDIUM

(71) Applicant: SAMSUNG ELETRÔNICA DA AMAZÔNIA LTDA., Campinas (BR)

(72) Inventors: Douglas David Baptista De Souza, Campinas (BR); Fernanda De Souza Ferreira, Campinas (BR); Guilherme Zucatelli Nossa, Campinas (BR)

(73) Assignee: SAMSUNG ELETRÔNICA DA AMAZÔNIA LTDA., Campinas (BR)

( * ) Notice: Subject to any disclaimer, the term of this patent is extended or adjusted under 35 U.S.C. 154(b) by 363 days.

(21) Appl. No.: 17/992,473

(22) Filed: Nov. 22, 2022

(65) Prior Publication Data

US 2024/0119956 A1 Apr. 11, 2024

(30) Foreign Application Priority Data

Sep. 29, 2022 (BR) ...................... 10 2022 019749-0

(51) Int. Cl.
*G10L 25/18* (2013.01)
*G10L 21/003* (2013.01)
(Continued)

(52) U.S. Cl.
CPC ............ *G10L 25/18* (2013.01); *G10L 21/007* (2013.01); *G10L 21/0232* (2013.01); *G10L 25/60* (2013.01)

(58) Field of Classification Search
CPC ......... G10L 25/18; G10L 25/60; G10L 25/48; G10L 25/30; G10L 25/51; G10L 21/007;
(Continued)

(56) References Cited

U.S. PATENT DOCUMENTS 9,824,683 B2 11/2017 Cui et al.
11,636,500 B1 * 4/2023 Jain .................... G06Q 30/0203 705/7.32
2005/0065782 A1 * 3/2005 Stachurski ............. G01R 23/20 704/205

(Continued)

FOREIGN PATENT DOCUMENTS

WO WO 2021/148391 A1 7/2021

OTHER PUBLICATIONS

Justus et al. (IDS, "Addressing Class Imbalance in Classification Problems of Noisy Signals by using Fourier Transform Surrogates", arXiv:1806.08675v2 [eess.SP] 28, Jan. 2019, pp. 1-8, https://arxiv.org/pdf/1806.08675) (Year: 2019).*

(Continued)

*Primary Examiner* — Leshui Zhang

(57) ABSTRACT

A computer implemented data augmentation method comprising receiving a dataset to be processed and, upon the received dataset being unclassified into classes, performing a clustering algorithm to partition the dataset whereby clusters formed are interpreted as the signal classes. The method further includes forming a sample dataset by gathering, for each class of a plurality of classes, at least two sample signals then applying a discrete Fourier transform (DFT) to each sample signal of the sample dataset. The method includes computing frequency parameters of each sample signal to determine, based on a spectral coherence threshold, frequency bands: relevant bands that characterizes a class. The method further includes injecting random noise in a phase spectrum of the non-relevant frequency bands of each sample signal of the sample dataset, to generate a set of augmented sample signals, and applying an inverse DFT, in each of the generated augmented sample signals.

9 Claims, 4 Drawing Sheets
(4 of 4 Drawing Sheet(s) Filed in Color)

(51) Int. Cl.

| | |
|---|---|
| ***G10L 21/007*** | (2013.01) |
| ***G10L 21/0232*** | (2013.01) |
| ***G10L 25/51*** | (2013.01) |
| ***G10L 25/60*** | (2013.01) |

(58) Field of Classification Search

CPC ................ G10L 21/0208; G10L 21/02; G10L 21/0232; G10L 21/003; G10L 21/0272; G10L 19/00; G10L 19/02; G10L 19/0204; G10L 19/008; G10L 19/018; G10L 19/005; G10L 19/03; G10L 15/063; G10L 15/16; G10L 13/02; G10L 21/0308; G10L 2021/0135; G10L 21/013; G10L 25/06; G10L 21/0264; G10L 21/0388; G10L 21/038; G10H 1/08; G06N 20/00

USPC ....... 704/205, 206, 216, 217, 218, 223, 237, 704/239, 245; 381/1–23

See application file for complete search history.

(56) References Cited

U.S. PATENT DOCUMENTS

| | | | | |
|---|---|---|---|---|
| 2007/0083365 | A1* | 4/2007 | Shmunk | G10L 21/0272 704/232 |
| 2017/0200446 | A1* | 7/2017 | Cui | G10L 15/063 |
| 2021/0073660 | A1* | 3/2021 | Zhang | G06N 5/04 |
| 2021/0287652 | A1* | 9/2021 | Sharma | H04R 3/005 |
| 2022/0262342 | A1* | 8/2022 | Naylor | G10L 15/14 |

OTHER PUBLICATIONS

Justus T.C. Schwabedal, et al. "Addressing Class Imbalance in Classification Problems of Noisy Signals by using Fourier Transform Surrogates", [eess.SP] ArXiv:1806.08675, vol. 2, Jan. 28, 2019.

C. Aldrich, "Chaotic signal processing by use of second order statistical methods and surrogate data analysis", Dept. of Chemical Engineering, South Africa, Jan. 31, 2016.

* cited by examiner

METHOD AND SYSTEM FOR PERFORMING DATA AUGMENTATION BASED ON MODIFIED SURROGATES, AND, NON-TRANSITORY COMPUTER READABLE MEDIUM

CROSS-REFERENCE TO RELATED APPLICATION(S)

This application is based on and claims priority under 35 U.S.C. § 119 to Brazilian Patent Application No. BR 10 2022 019749 0, filed on Sep. 29, 2022, in the Brazilian Intellectual Property Office, the disclosure of which is incorporated by reference herein in its entirety.

FIELD OF THE DISCLOSURE

The technical field of this invention is signal processing applied to the data augmentation approach regarding signal classification. The expertise and technical language required to understand the concepts described herein lie in the intersect area between the disciplines of signal processing and machine learning. In its core, the proposed invention is a data augmentation methodology to be applied to datasets. The goal is to generate new signals (e.g., temporal realizations of a class) that are statistically similar to classes already on the dataset. This is accomplished by considering the relevant frequency bands of such classes, which can be measured across available signals.

Some of the application areas include but are not limited to the classification of different types of signals and waveforms in the areas of: natural language processing and environmental sounds classification (audio), Medical diagnosis (ECG/EEG), Industry (vibration) and Geology (seismic signals).

The data augmentation method according to the present invention can be understood as a generic tool for any dataset, independent of its nature (e.g., being labeled or unlabeled, balanced or unbalanced, etc.), as it focus on creating new signals that have statistical similarity with the data already available within the dataset. This way, the proposed method is able to generate and incorporate relevant new signals to any dataset, increasing the stochasticity in the available data and thus improving the generalization and classification for each class. The procedure described therein can also be seen as a pre-process step of algorithms used for signal classification, such as stochastic models or machine learning frameworks.

DESCRIPTION OF RELATED ART

One of the main limitations of machine learning systems is the fact that datasets used for model training and evaluation (be it for classification, regression or any other purpose), are often just a small portion—a snapshot—of the infinite dataset available (at least in principle) in the real world. Ideally, the dataset at hand should resemble as much as possible this infinite, inaccessible data. Approaching this problem from a statistical point of view, the finite sample dataset available should exhibit the same stochastic properties of the unattainable real-world data, if there were any means to probe and store all the existing data available to be collected. One way to do so is to ensure the joint probability distribution of the sample dataset is, to a certain extent, similar to the hypothesized dataset distribution. In this way, when testing the model in new (unseen) data, it would be less prone to prediction errors. It is observed that, to make the sample dataset to resemble more the population data in a statistical sense (e.g., by making their probability distributions look more similar), it is often necessary to increase the variability of the sample dataset. It can be done, for instance, by applying random transformations to samples belonging to the available datasets, and creating new samples. Such a technique is often called data augmentation.

In machine learning systems built for processing and classifying signals (be it audio, biomedical signals, earthquakes, or other forms of time series), data augmentation usually concerns the application of either transformations that are too domain specific (e.g., pitch shift and reverberation for audio, application of near-peak amplitude gain for EEG signals, etc.), or transformations that are too generic and aggregate very little information to the augment samples (e.g., simple addition of white background noise). The reason for using domain-specific data augmentation is to mimic particular effects that the signals being processed or analyzed would undergo in real scenarios. For example, the recorded sound of someone speaking in a large room can oscillate in pitch or exhibit different levels of reverberation depending on factors such as the current emotion of the speaker and the number of people sharing the same space, respectively. On the other hand, the application of generic data augmentation transformations is related to the fact that, if we had access to unseen signals from the real world, most likely these new signal samples would be sensed from environments and/or by using acquisition systems that could modify the signal in random, intangible manners. A machine learning system would respond more correctly to such real-world situations if it had been trained on a dataset that somehow exhibited all these possible variations, at least in a statistical sense.

One limitation involving data augmentation techniques which are either too domain specific or too generic is that, in order to generate the required variability from the input data, one often needs to apply a huge number of random transformation and augment the dataset to several times its original size. Such a process can be considerably time consuming, and the storage space/memory required to store all the augmented data can turn out to be prohibitively high.

Modern wakeup and keyword spotting tasks (e.g., Samsung's "Hi Bixby") share some similarities with other state-of-the-art machine learning systems built for classifying signals of all sorts (e.g., biomedical signals, vibration signals, etc.). These similarities concern, for example:

1) the use of convolutional neural networks (CNN);
2) the need to transform the input signal from time domain to time-frequency domain, creating image-like input features to be processed by the CNN architecture (e.g., a spectrogram),
3) the need of selecting a pool of data augmentation effects to increase the stochasticity in the training data and thus improving the generalization capability of the model.

Several data augmentation methods are based on reducing the inevitable mismatch between the signals available for training and the actual signals to be classified. These methods usually rely on creating different versions of the available signals, such as by applying noise mixing strategies, time shifting or reverberation effects. Although these strategies can indeed improve the model's accuracy tested under adverse scenarios, they do not generate new realizations of stochastic processes that belong to a specific class.

In that sense, there are documents in the state of the art that deal with data augmentation methods to improve variability and significance in small or limited datasets.

The paper "*Addressing class imbalance in classification problems of noisy signals by using Fourier transform surrogates*", by J. T. C. Schwabedal, J. C. Snyder, A. Calmak, S. Nemati, and G. D. Clifford (hereinafter "Shwabedal et al.") discloses a method to alleviate the class imbalance problem in biomedical signal classification applications by employing the standard surrogate method to create synthetic electroencephalogram (EEG), electromyography (EMG), and electrooculography (EOG) time-series. The idea is to generate synthetic versions (replicas) of signals misrepresented in the dataset (these rare signals might correspond, for example, to particular biological phenomena) by surrogate augmentation, which can be obtained, for example, by replacing the whole time-series data obtained from a given sensor channel by its surrogate counterpart. Other application discussed in this paper consists of splitting specific time segments from the original signals (that may be related to some specific anomalous behavior) and augment that particular segment by means of the surrogate technique. By doing so, one could oversample the original dataset and obtain new time series with only the desired segment augmented.

Patent application WO2021148391, titled "Augmentation of Multimodal Time Series Data for Training Machine learning Models", discloses a method to create synthetic time series to be employed as a data augmentation strategy in machine learning tasks involving classification or regression. The method creates generative models (thus considering the distribution of the data) characterizing the statistical behavior of the time-series by considering some a-priori information on the physical phenomena/processes governing the training data to be augmented.

Patent application US2021073660, titled "Stochastic Data Augmentation for Machine Learning", focuses on the manner data-augmentation effects are inserted in the training data. More precisely, the authors propose to obtain, from a pseudo-random or deterministic process, a variable that is a seed or a control parameter of the data augmentation technique, generating a new data instance as output given a data instance as input. A conditionally invertible function is then employed to estimate target labels for new data instances.

Patent U.S. Pat. No. 9,824,683 "Data augmentation method based on stochastic feature mapping for automatic speech recognition", discloses methods of Stochastic Feature Mapping (SFM) combined with Vocal Tract Length Perturbation (VTLP). These techniques are used in combination to form a framework intended to be used in applications of voice biometrics. The proposed data augmentation targets at improving the generalization capability of machine-learning-based systems for speaker recognition by simulating characteristics specific to a given speaker's voice.

The paper "*Chaotic signal processing by use of second-order statistical methods and surrogate data analysis*", by C. Aldrich, discloses a signal denoising technique based on signal analysis/processing frameworks such as singular spectrum analysis (SSA) and classical surrogates. Singular spectrum analysis is used for signal decomposition, which allows assessing the estimated signal components in a systematic fashion for the denoising task. On the other hand, the surrogate technique is used to create stationary references of the signal, which can be used as benchmarking of the noise characteristics.

Despite the methods disclosed in the abovementioned documents being able to provide augmented datasets, there are still limitations in current techniques. For instance, in Schwabedal the same default surrogate methodology is employed regardless of the signal or dataset characteristics. In addition, the choice of which signals or signal segments will undergo the surrogate creation process depends on a-priori knowledge of the field (i.e., the user will transform specific signals or segments presenting the desired signature based on biological considerations).

It is therefore an objective of the present invention to provide a new data augmentation technique for any type of signal that allows creating more assertive datasets, reducing the amount of time spent to create data with the necessary variability (i.e., relevant in comparison to the population data), and total size of the augmented data. It is also an objective of the present invention to provide a method to modify the data within a dataset in a more specific way than simply adding random noise to the data (or its features), thus avoiding a data augmentation approach that would be too simplistic. Notwithstanding, another objective of the method according to the present invention is to provide a technique that maintains a certain level of arbitrariness on the chosen data augmentation, in turn avoiding creating a data augmentation effect that is over-specific.

The method according to the present invention has been designed as a data-driven data augmentation strategy that is able to create random new realizations (signals) of a class, taking the least relevant frequency bands of that class into account. This means that the methodology is able to generate new signals of a class that have statistical similarity with the available data for that same class. Moreover, the proposed data augmentation is completely independent of the dataset nature and characteristics. This also implies that it is agnostic of the classification system on hand. Therefore, the method can be applied to all sorts of datasets and increase the representativity of each class. The data augmentation method for signals proposed herein is built based upon these premises. A summary of the proposed method is disclosed herein below.

SUMMARY OF THE INVENTION

To solve the technical challenges and limitations of the prior-art, the present invention proposes a computer implemented data-driven agnostic data augmentation method comprising the steps of: receiving a dataset to be processed; if the received dataset is not previously classified into classes, a clustering algorithm is performed to partition the data, wherein the clusters formed are then interpreted as the signal classes; forming a sample dataset by gathering, for each class of the plurality of classes, at least two sample signals.

The method includes applying a discrete Fourier transform, DFT, to each sample signal of the sample dataset; computing the frequency parameters of each sample signal to determine, based on a spectral coherence threshold, the relevant and non-relevant frequency bands; injecting random noise in the phase spectrum of the non-relevant frequency bands of each sample signal of the sample dataset, to generate a set of augmented sample signals; and applying an inverse DFT, in each of the generated augmented sample signals.

The method of the present invention may optionally comprise assessing the validity of the generated set of augmented sample signals to determine whether more augmented sample signals need to be created. The criteria for determining validity of a set of augmented sample signals may preferably comprise:

- determining whether a minimum number of augmented sample signals was generated, determining whether the augmented sample signals are within a quality threshold, and determining whether the augmented sample signals are within a similarity threshold relative to the original signals.

In addition, assessing whether more augmented sample signals need to be generated further comprises:

returning to the step of injecting random noise in the phase spectrum if the number of augmented samples is below the minimum;

returning to the step of forming a sample dataset if the augmented sample signals are outside a quality threshold; and returning to the step of computing the frequency parameters of each sample signal if the augmented sample signals are outside the similarity threshold relative to the original signals.

The present invention also refers to a system for performing the data-driven agnostic data augmentation method. The system comprises at least one processor and a storage medium, wherein the storage medium comprises instructions that, when executed by the at least one processor, causes the system to perform the method according to the present invention.

Lastly, the present invention may also comprise a non-transitory computer readable medium comprising instructions that, when executed by at least one processor, causes the at least one processor to perform the method as defines by the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is explained in greater detail below and makes references to the drawings and figures, attached herewith, when necessary. Attached herewith are.

Figure 1:
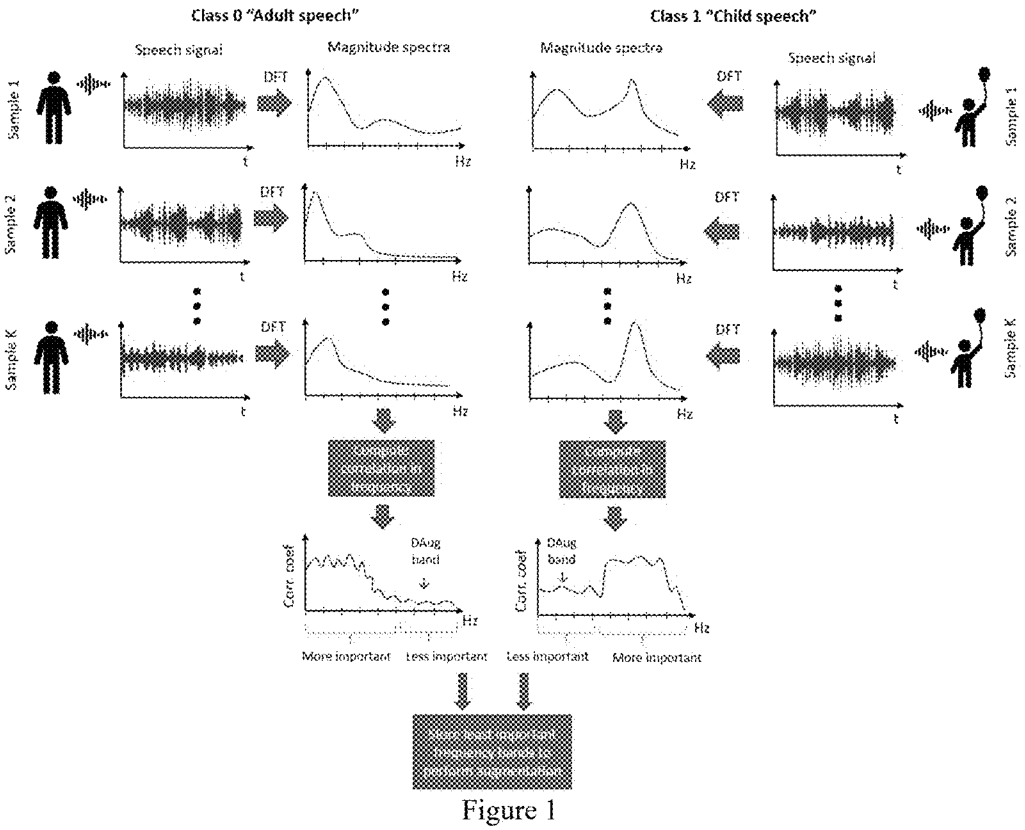
FIG. 1 shows an example of how the most and the least relevant regions of the spectra of 1, . . . , K signals from different classes can be identified, according to an embodiment of the present invention.

The objectives and advantages of the current invention will become clearer by means of the following detailed description of the example and non-limitative Figures.

DETAILED DESCRIPTION OF THE INVENTION

It is important to note that within the present detailed description, the term "DAug bands" stands for "Data Augmentation bands" and refers to specific less relevant bands of a signals' spectra which may be subject to random noise addition according to the present invention.

Data augmentation is a technique commonly used to boost the performance of machine learning models by creating new data samples or by transforming the existing ones. In the field of machine learning for signal classification and processing, generally we can choose between data augmentation methods that are fully agnostic to the nature of the signals, or those that are tailored made for the application domain. Application-agnostic data augmentation has the advantage of not requiring specific domain knowledge about the signal's nature, but often results in samples with very little information aggregated. On the other hand, application-specific data augmentation can generate less redundant samples, but they often require some level of understanding about the physical mechanism or phenomena producing the signals.

The proposed technique stands as a more balanced "middle-ground" solution between being too specific vs. being too generic when performing data augmentation. More precisely, the method of the present invention proposes taking advantage of information gathered on the signal nature/domain application in a data-driven fashion, by analyzing the class/group divisions intrinsically present in the dataset and estimating the frequency bands that are more significant to each class or group.

If the dataset is not already divided into classes, a clustering routine may be performed to identify likely groups in the data. Relevant frequency bands are found by computing the average spectral coherence (e.g., cross spectral density) between signal pairs from the dataset. Frequency bands are sorted based on the spectral coherence values. Relevant frequency bands are defined by greater values based on a threshold, which is application-dependent. One example of initialization would be to define the threshold such that relevant frequency bands are the ones on the higher quantiles of a quantile division for the spectral coherence distribution. Frequency bands deemed as relevant are kept unchanged, while less important bands, the ones with coherence values below the threshold, are considered as target to inject random noise in the signal spectra. Noise injection is performed in the phase spectrum leaving the magnitude spectrum untouched. Doing so preserves the original signal spectral information as much as possible, while using the least relevant frequency bands (denoted here as "Data Augmentation bands" or, simply, "DAug bands"), as means to acquire new realizations of the stochastic process related to each class. This is performed by applying the inverse Fourier transform (i.e., the inverse transform is applied to return the data to the time domain) after the noise injection. This way, we obtain as many augmented signals as random noise injections are performed, while preserving the most important information or the characteristics which are more relevant for classifying a signal or waveform sample.

Issues involving data augmentation procedures that are too time consuming or less assertive may be alleviated for the cases in which the training and evaluation datasets concern only a limited number of classes or groups. For these cases, the following is assumed: suppose one could gather from the real world a very large number of samples of the different classes of interest in such a way that these datasets exhibit a mixture of environment effects and other phenomena that manifest when a sufficiently large number of realizations of their corresponding stochastic processes is available.

If all signal samples are grouped together by the classes of interest-assuming these classes or groups are indeed representative of the real-world data-then despite the wide variety of environment effects and other phenomena being manifested in these signal samples, in general some frequency bands would tend to be more excited than others for the considered groups (except for the case in which the dataset involves the classification of white noise). In many cases, signal samples belonging to the same class/group will tend to share similar energy levels in similar frequency bands (i.e., their spectral content is generally more concentrated in certain bands compared to samples from different classes). This means that same-class signals are more likely to be highly correlated in certain frequencies, which can be a consequence of the characteristics being prominent in that specific class or group.

Discrete Fourier Transform (DFT)

To better understand the method of the present invention, a review of the Fourier transform and spectral representation aspects is herein provided. In the vast majority of cases, signals are acquired, processed and analyzed as time series, that is, as a collection of values varying sequentially in time in evenly spaced intervals. Such an interpretation is correct, though as time series, signals can also be processed and analyzed in the frequency domain. The representation in frequency domain of a given discrete-time signal x(n) can be obtained by computing its discrete Fourier transform (DFT).

$$X(f) = \sum_{n=0}^{N-1} x(n) e^{-i2\pi nf/N} \tag{1}$$

where=$\sqrt{-1}$. Thanks to the Euler decomposition formula $e^{-i2\pi nf/N}=\cos(2\pi nf/N)+i\sin(2\pi nf/N)$, we can express X(f) also as $$X(f) = \sum_{n=0}^{N-1} x(n)\cos\left(\frac{2\pi nf}{N}\right) + ix(n)\sin\left(\frac{2\pi nf}{N}\right). \tag{2}$$

Thus, X(f) is a complex variable. As any complex number, X(f) can be written in polar coordinates as follows:

$$X(f)=\mathrm{Re}[X(f)]+i\ \mathrm{Im}[X(f)]=|X(f)|e^{\angle X(f)}. \tag{3}$$

In (3), |X(f)| and ∠X(f) are the amplitude and the phase of X(f). The former measures how much energy the signal exhibits per unit of frequency (loosely speaking, the intensity of each complex sinusoid in (2)). The latter tells by how much individual complex sinusoids are delayed (in angle/radians units) to compose X(f) in the summation in (2). Amplitude |X(f)| and phase ∠X(f) can be formally computed as $$|X(f)| = \sqrt{\mathrm{Re}[X(f)]^2 + \mathrm{Im}[X(f)]^2} \tag{4}$$

and $$\angle X(f) = a\tan\frac{\mathrm{Im}[X(f)]}{\mathrm{Re}[X(f)]} \tag{5}$$

Note that (4) and (5) are functions of the frequency variable f. Therefore, |X(f)| and ∠X(f) are commonly referred to as the two spectra of x(n): the amplitude and the phase. Finally, we can use (4) and (5) to compute back x(n) via the inverse Fourier transform (inverse DFT)

$$x(n) = \frac{1}{N}\sum_{f=0}^{N-1} |X(f)| e^{i\angle X(f)} e^{\frac{i2\pi nf}{N}} \tag{6}$$

Technical Effect

Data augmentation applied to a given signal considers the stochastic and spectral characteristics of signals that belong to the same class, or that share similarity with the current signal being augmented. Consequently, more assertive synthetic samples can be created via data augmentation. In addition, since the augmenting effects (i.e., stochasticity) are being applied only to the phase spectrum, the augmented signal samples tend to resemble more those in the original signal space, which can benefit subsequent analysis involving representation and human interpretation. More specifically, augmented samples are the real counterparts of the stop-band filtered versions of the original signals, whereas the frequency stop of the band-pass filters can be determined by analyzing relevant bands of signals belonging to the same class (or signals that share a certain similarity according to some criterion).

In other words, the method proposed herein may be considered a modified surrogate which is able to achieve an expected value that is similar to an ideally filtered version of the target signal.

As presented in Equation (6), a discrete signal x(n) can be represented by the inverse Fourier transform of its spectrum X(f). Denoting X(f) by the amplitude |A(f)| and phase Φ(f) components, x(n) can be rewritten as $$x(n) = \frac{1}{N}\sum_{f=0}^{N-1} |A(f)| e^{i\Phi(f)} e^{\frac{i2\pi nf}{N}} \tag{7}$$

The surrogate signal as defined in the standard surrogate method is obtained by replacing Φ(f) for an i.i.d. (independent and identically distributed) sequence uniformly distributed over [−π, π], i.e., replacing all the points of the phase spectrum with a realization of Ψ(f)~U[−π, π] and taking the real part of the inverse Fourier transform as $$s(n) = \frac{1}{N}\sum_{f=0}^{N-1} \mathrm{Re}\left\{|A(f)| e^{i\Psi(f)} e^{\frac{i2\pi nf}{N}}\right\}. \tag{8}$$

Note that this expression is equivalent to $$s(n) = \frac{1}{N}\sum_{f=0}^{N-1} \mathrm{Re}\left\{|A(f)| e^{i\left(\Psi(f)+\frac{2\pi nf}{N}\right)}\right\} = \frac{1}{N}\sum_{f=0}^{N-1} |A(f)|\cos\left[\Psi(f) + \frac{2\pi nf}{N}\right] \tag{9}$$

If x(n) is an observed, already-recorded realization of a stochastic process, then x(n) itself can be regarded as a deterministic sequence. The surrogates s(n) generated from x(n) by means of (uniform) random noise injection, can be considered as random processes built upon x(n).

Different from the classical surrogate transformation s(n), the modified surrogate transformation s'(n) proposed herein preserves the most relevant frequency components of x(n) related to a specific class or correlated signals. To this end, consider $\kappa_{rand}=[\kappa_{rand,1}), \ldots, \kappa_{rand,F}]$ as the set of frequency bands to apply data augmentation ("DAug bands"), i.e., a set of non-relevant frequency bands used as target for performing data augmentation via random noise injection and $\kappa_{det}$ the remaining set of frequency bands that are kept deterministic. A modified surrogate s'(n) is obtained by noise injection Ψ(k)~U[−π, π] only over the non-relevant frequency bands (DAug bands) related to the phase spectrum Φ(f). By doing so, the modified phase Φ'(k) can be written as $$\Phi'(k)=[\Phi(1),\ldots,\Phi(K),\Psi(\kappa_{rnd,1}),\ldots,\Psi(\kappa_{rnd,F}),\Phi(N-(K+F)),\ldots,\Phi(N)] \tag{10}$$

where Ψ(k) are realizations of U[−π, π] over the DAug bands $\kappa_{rand}$ and Φ(k) represents the phase on the other frequency bands assuming deterministic values that are only dependent on the already-recorded stochastic process x(n).

As s'(n) can be represented by a sum over cosine components given by Equation (9), the modified surrogate signal s'(n), as proposed in the present invention, can be expressed by:

$$s'(n) = \frac{1}{N}\sum_{k\in\kappa_{det}} |A(k)|\cos\left[\Phi(k)+\frac{2\pi nk}{N}\right] + \frac{1}{N}\sum_{k\in\kappa_{rand}} |A(k)|\cos\left[\Psi(k)+\frac{2\pi nk}{N}\right] \tag{11}$$

Note that the modified surrogate s'(n) is composed of a deterministic (sum over $\kappa_{det}$) and a random (sum over $\kappa_{rand}$) part. Therefore, for the sake of clarity, it can be expressed as $$s'(n) = s'_{det}(n) + s'_{rand}(n), \tag{12}$$

where $$s'_{det}(n) \text{ and } s'_{rand}(n)$$

are the deterministic and random components of s'(n), respectively.

At this point, it is interesting to analyze the signal transformation generated by the modified surrogate approach by means of its expected value. From Equation (12), E[s'(n)], the expected value of s'(n), can be written as $$E[s'(n)] = E[s'_{det}(n)] + E[s'_{rand}(n)] \tag{13}$$

which is equivalent to $$E[s'(n)] = s'_{det}(n) + E[s'_{rand}(n)] \tag{14}$$

as the expected value of a deterministic variable (in this case, $$s'_{det}(n))$$

is the variable itself. This means that calculating $$E[s'(n)]$$

amounts for computing $$E[s'_{rand}(n)]:$$

$$\begin{aligned} E[s'_{rand}(n)] &= \frac{1}{N}\sum_{k\in\kappa_{rand}} E\left\{|A(k)|\cos\left[\Psi(k)+\frac{2\pi nk}{N}\right]\right\} \\ &= \frac{1}{N}\sum_{k\in\kappa_{rand}} |A(k)|E\left\{\cos\left[\Psi(k)+\frac{2\pi nk}{N}\right]\right\}, \end{aligned} \tag{15}$$

since Ψ(k) is the only non-deterministic component inside the expected value operator. Note that $$\cos\left[\Psi(k)+\frac{2\pi nk}{N}\right]$$

can be expanded as $$\cos\left[\Psi(k)+\frac{2\pi nk}{N}\right] = \cos[\Psi(k)]\cos\left[\frac{2\pi nk}{N}\right] - \sin[\Psi(k)]\sin\left[\frac{2\pi nk}{N}\right], \tag{16}$$

and therefore, the expectation of (15) can be written as $$E\left\{\cos\left[\Psi(k)+\frac{2\pi nk}{N}\right]\right\} = E\{\cos[\Psi(k)]\}\cos\left[\frac{2\pi nk}{N}\right] - E\{\sin[\Psi(k)]\}\sin\left[\frac{2\pi nk}{N}\right]. \tag{17}$$

The straightforward expected values computation for these expressions are obtained by $$E\{\cos[\Psi(k)]\}=\int_{\Psi} f_{\Psi}\cos[\Psi(k)]d\Psi \tag{18}$$

and $$E\{\sin[\Psi(k)]\}=\int_{\Psi} f_{\Psi}\sin[\Psi(k)]d\Psi, \tag{19}$$

where $f_{\Psi}$ is the probability density function (PDF) of Ψ(k) defined by Ψ(k)~U[−π, π]. Therefore, $$E\{\cos[\Psi(k)]\} = \int_{-\pi}^{\pi} f_{\Psi}\cos[\Psi(k)]d\Psi = \sin[\Psi(\pi)] - \sin[\Psi(-\pi)] = 0 \tag{20}$$

and $$E\{\sin[\Psi(k)]\} = \int_{-\pi}^{\pi} f_{\Psi}\sin[\Psi(k)]d\Psi = \cos[\Psi(-\pi)] - \cos[\Psi(\pi)] = 0. \tag{21}$$

By substituting these expressions on (17), it follows that $$E\left\{\cos\left[\Psi(k)+\frac{2\pi nk}{N}\right]\right\} = \{0\}\cos\left[\frac{2\pi nk}{N}\right] - \{0\}\sin\left[\frac{2\pi nk}{N}\right] = 0 \tag{22}$$

which, from (15), is equivalent to showing that $$E[s'_{rand}(n)] = \frac{1}{N} \sum_{k \in \kappa_{rand}} |A(k)|\{0\} = 0 \tag{23}$$

and therefore $$E[s'(n)] = s'_{det}(n) + E[s'_{rand}(n)] = s'_{det}(n) + \{0\} = s'_{det}(n),$$

which can be written as $$E[s'_{rand}(n)] = s'_{det}(n) = \frac{1}{N} \sum_{k \in \kappa_{rand}} E\left\{|A(k)|\cos\left[\Psi(k) + \frac{2\pi nk}{N}\right]\right\}. \tag{24}$$

This means that the expected value of the modified surrogate s'(n) equals its deterministic component $s'_{det}(n)$. This is a key result obtained by the proposed modified surrogate approach. Every new realization of Ψ(k) will lead to a different surrogate signal s'(n) on the Data Augmentation process, maintaining the same expected value related to the deterministic component. As the deterministic part of the target signal is, by definition of the proposed modified surrogate, the most important regions related to a class, the generated modified surrogates preserve the main similarities regarding that class while presenting new variabilities on the DAug frequency bands.

Correlation in the Spectral Domain

Employing a discrete Fourier transform (DFT) to compute signal spectra can yield insightful results, especially when accounting for the correlations in frequency domain shared by signals from the same class. To illustrate this idea in terms of a signal classification task, we make reference to FIGS. 1 and 2. Suppose dealing with the problem of classifying recorded speech signals into two classes: "adult speech" and "child speech". The audio samples belonging to the class "child speech" will tend to exhibit more energy in high frequency bands than "adult speech" signals. The high-pitched voice is therefore a characteristic that is prominent for the class/group of "child speech". Conversely, "adult speech" will tend to exhibit more energy at lower frequency bands. In other words, if the correlation in frequency bands using all the spectra from audio samples of a given class (e.g., "adult speech" class) is computed (e.g., via cross spectral density) and if a region of the spectrum is deemed as less relevant to that class must be selected (i.e., frequency bands with lower spectral coherence values, that does not impair the quality of the signal), then the region(s) in which the samples spectra are less correlated in frequency would be good "less relevant" spectral regions (or frequency bands) candidates.

Hence, frequency bands that are more highly correlated over a given signal class (like "adult speech"), could be taken as representative of the frequency bands that are most often excited for that class, or the most relevant frequency bands. On the other hand, frequency bands that are less correlated could be taken as representative of the least excited frequency bands, or the least relevant bands. The bands for which the spectra are less correlated are more prone to exhibit (or will mask less) the artifacts that the environment or the sound acquisition system would impose to the clean "ideal" audio. FIG. 1 illustrates this example of classifying speech segments into "adult speech" and "child speech" classes and shows a scheme on how more frequently excited frequencies for a given class (low frequencies in case of "adult speech", and high frequencies in case of "child speech") may result in increased correlation in the frequency domain for all samples of the chosen classes.

Still referring to FIG. 1, it shows an example of how the most and the least relevant regions of the spectra of 1, . . . , K signals from different classes can be identified. Discrete Fourier transform (DFT) can be used to obtain a spectral representation of each signal, from where the magnitude curve (magnitude of the DFT vs. frequency) can be computed. Frequency bands that are more frequently excited for a given class (Class 0 being "adult speech" and class 1 being "child speech") may correspond to regions in which the magnitude spectra are highly correlated. For performing data augmentation, it is proposed to select the least important frequency bands for each class, which in this example would be the high-frequency regions of the spectra for the "adult speech" class and the lower ones for the "child speech" class.

Figure 2:
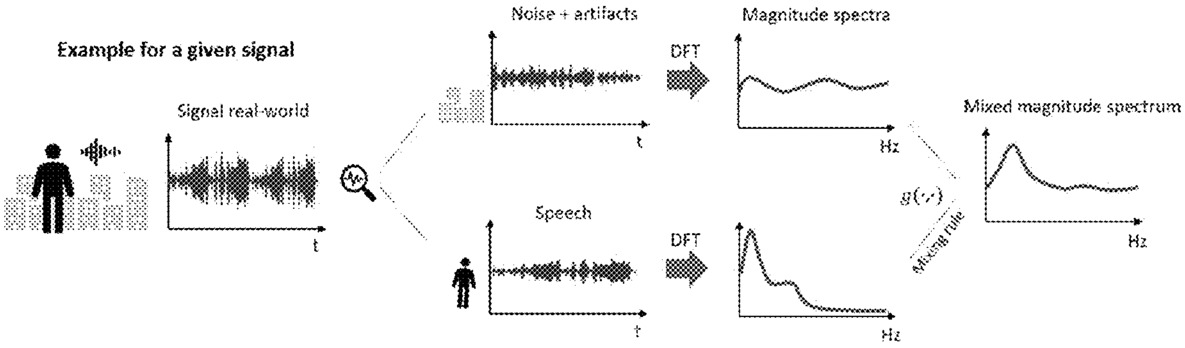
FIG. 2 shows an example of a speech signal (belonging to the class "adult speech" from FIG. 1) being acquired in real world, according to an embodiment of the present invention.

In signal classification and processing applications, data augmentation generally means recreating additional realizations of the signal (or the signal features) resembling the ones that would be obtained if another time series was acquired in the same settings in which the original ones had been recorded/acquired. Additional realizations of the signals can be approximated by applying random operations that would mimic transformations the original signals would undergo upon travelling from the physical mechanisms/phenomena generating them, to the data recording device. The effects of the environment or the "channel" (here, loosely considered as the medium between the signal source and recorder) can be interpreted as the result of mixing a clean "source" signal to a noise signal characteristic of the collective effects of the environment, or any other artifacts imposed on the clean data. Such a mixing between clean and noise/artifact signals can be described by a mathematical rule that combines the data in a linear or a nonlinear fashion, and the actual signal being acquired in the real world can be considered to have this mixing. The above scheme is shown in FIG. 2, where the "clean" and "noise+artifact" counterparts from an arbitrary real-world speech signal of class "adult speech" are shown, together with their spectra.

Figure 3:
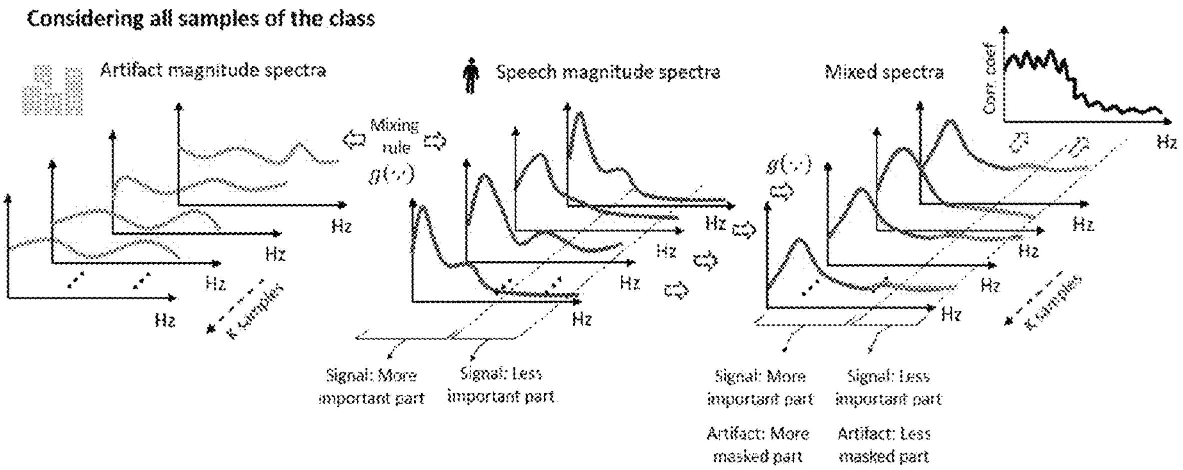
FIG. 3 shows an illustrative example of how the less important parts of the spectra are more affected by noise, according to an embodiment of the present invention.

FIG. 3 illustrates in more details the idea of identifying the less relevant frequency bands in the original signals (the "DAug bands") by assessing the correlation shared by the original signal spectra. Notice that the frequencies the clean signals tend to exhibit higher spectral concentration are i) the frequencies over which the spectra of the artifact/noise are likely be more masked, and ii) the frequencies we would like to preserve from injecting random noise in data augmentation since, being the frequencies more frequently excited overall, they tend to be more relevant to the signal class/group. The proposed method separates the less relevant frequency bands (or "DAug bands") from the most relevant ones. Having identified the "DAug bands" corresponding to each class of signal present in the dataset, data augmentation is performed by injecting variability (randomness) only in the "DAug bands", while maintaining the more important/excited bands of the spectrum intact for each signal. Then, by applying the inverse Fourier transform to return the data to the time domain, compute the real part of the inversed-transformed signal (to ensure a real-valued time series is obtained), there will be as many augmented signals as random noise injections are performed.

The Data Augmentation Framework

Figure 4:
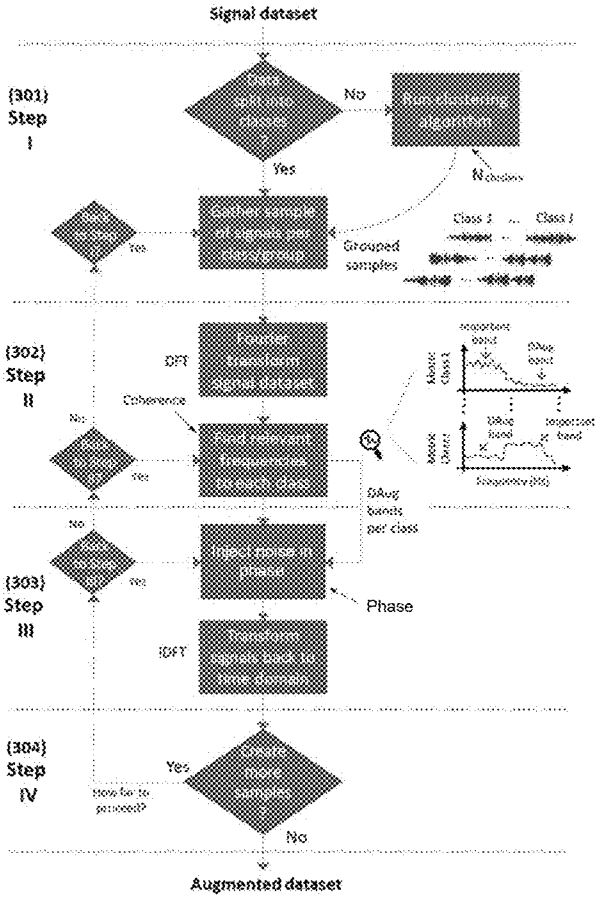
FIG. 4 shows an illustrative flowchart of an embodiment of the method of the present invention, according to an embodiment of the present invention.

The various aspects of the proposed method are described below and illustrated by means of the preferred embodiment flowchart shown in FIG. 4.

Step I: This step concerns receiving 301 an adequate dataset to be processed by the framework. The data should contain signals that are relevant to each class. The relevance of the signal samples compared to the available classes is assessed by a module that samples (gathers) 302 signal from the original database, filtering out signals that exhibit noise-like characteristics, such as uncorrelated samples (flat spectrum) and high energy at high frequencies. The case of a flat spectrum can be assessed by computing the Spectral Flatness Measure (SFM) and checking if it takes a value close to 1. If so, it would indicate that the signal behaves as a white noise process and should not be used for augmentation. The case of high energy at high frequencies can be assessed by computing the fraction of spectral energy the signal exhibits close to the Nyquist frequency. If it is greater than a given percentage of the total spectral energy (e.g., 20%), then the signal is considered as noise and not used for augmentation. If the data is not originally divided into classes or groups, a clustering algorithm may be performed 311 to find a candidate partitioning of the data, in which the clusters formed are then interpreted as the signal classes or groups. The output of this step is a signal dataset whose samples (signals) are supposed to be representative of the classes/groups found in (or mined from) the data.

Step II: Having determined a candidate dataset for analysis, the next stage of the framework is concerned with operations in the frequency domain. More precisely, the discrete Fourier transform (DFT) is applied 303 to each signal from the candidate dataset built in step I and, as a result, amplitude and phase spectra can be computed for each signal sample. The signal spectra are then used as inputs of an algorithm that finds 304 the most important frequencies to each class by estimating their average spectral coherence curve (a sort of correlation function in frequency domain), yielding one coherence value vs. frequency curve per class. Frequency bands corresponding to higher coherence values are deemed as more relevant to that class, and they are kept unchanged in the data augmentation procedure. On the other hand, frequency bands associated with lower coherence values are considered as unimportant to that class. These “not relevant” frequency bands are deemed as “DAug bands” and used as target for performing data augmentation via random noise injection.

Step III: This step is responsible for carrying out the data augmentation per se. It takes as input the signal dataset from Step I with the spectral quantities computed in Step II appended (i.e., the=phase spectrum for each signal and the reference DAug frequency band for each class). The augmentation is carried out by injecting 305 random noise in specific parts of the phase spectrum. The noise injection itself is carried out by replacing the original phase values over the DAug bands by synthetic random white noise, uniformly distributed over $U[-\pi, \pi]$. Having injected noise at the selected frequencies, the algorithm then uses the modified phase spectrum to compute 306 the inverse DFT transform and get back the signals in time domain. To guarantee the obtained signal is a time series in the real numbers domain, the real operator is applied to the inverse-transformed signal. We can generate as many signals as random noise injections are performed. Each noise injection round increases the number of augmented signal samples.

Step IV: The process of creating augmented signals has several steps, from the selection of relevant signals in the original dataset in Step I, passing through the computation of the DAug bands in Step II, and the noise injection in phase spectrum in Step III. Therefore, arriving at Step IV, the user will have at hand a candidate pool of augmented signals that is dependent on the choices made in previous steps. This set of augmented signals can be analyzed and assessed 307 as valid or not. The purpose of Step IV is to carry out such an assessment. More specifically, in this step a verification routine is performed to check if more augmented samples need to be created. Criteria to create more samples can be:

i. if the desired number of augmented signals was not created (e.g., due to some unexpected error when creating a given augmented sample), ii. some metric of quality for the augmented signals does not meet the required standard (e.g., the generated samples are too noisy, or with too little variability), which the metric depends on the domain application (e.g., for speech signals the PESQ and POLQA ITU-T-International Telecommunications Union-quality measures could be considered as well as the STOI intelligibility objective measure), and iii. the augmented signals are too similar (or too dissimilar) in comparison to the original signals. Such a similarity can be assessed by means of a threshold for similarity, which can be one input parameter of the method. The similarity may be measured as distribution distances on temporal and/or spectral domain (e.g., Bhattacharyya distance, Mahalanobis distance, etc.). The threshold is defined based on the application itself, a generic example would be to adopt the average of the similarity distribution more or less two standard deviations. If according to some of these criteria the script flags that the augmented sample of signals is not good enough yet, then the user has the option to return to the previous steps to repeat the augmentation procedure.

Since Step I, II, and III influence the creation of the final set of augmented samples, we can return 317, 327, 337 to each one of these steps to execute the data processing again. Finally, if the set of augmented signals passes the validation assessment of Step IV, the framework outputs the augmented dataset, which can be further used in subsequent machine learning tasks.

Hardware Implementations

It is worth mentioning that the example embodiment described herein may be implemented using hardware, software or any combination thereof and may be implemented in one or more computer systems or other processing systems. Additionally, one or more of the steps described in the example embodiment herein may be implemented, at least in part, by machines. Examples of machines that may be useful for performing the operations of the example embodiments herein include general purpose digital computers, specially-programmed computers, desktop computers, server computers, client computers, portable computers, mobile communication devices, tablets, and/or similar devices.

For instance, one illustrative example system for performing the operations of the embodiment herein may include one or more components, such as one or more processors, for performing the arithmetic and/or logical operations required for program execution, and storage media, such as one or more disk drives or memory cards (e.g., flash memory) for program and data storage, and a random access memory, for temporary data and program instruction storage.

Moreover, the aforementioned system of the present invention may also include software resident on a storage media (e.g., a disk drive or memory card), which, when executed, directs the microprocessor(s) in performing transmission and reception functions. The software may run on an operating system stored on the storage media and can adhere to various protocols such as the Ethernet, ATM, TCP/IP protocols and/or other connection or connectionless protocols.

As is well known in the art, microprocessors can run different operating systems, and can contain different types of software, each type being devoted to a different function, such as handling and managing data/information from a particular source, or transforming data/information from one format into another format. The embodiment described herein is not to be construed as being limited for use with any particular type of computer, and that any other suitable type of device for facilitating the exchange and storage of information may be employed instead.

In this regard, the present invention relates to a system for detecting malware in an application to be installed on a device using the method in accordance with the present invention, wherein the system comprises: at least one processor and a storage medium, wherein the memory comprises instructions that, when executed by at the at least one processor, causes the system to perform the method as defined in the present invention.

Software embodiments of the example embodiments presented herein may be provided as a computer program product, or software, that may include an article of manufacture on a machine-accessible or non-transitory computer-readable medium (also referred to as "machine-readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine readable medium suitable for storing or transmitting electronic instructions.

Thus, the present invention also relates to a non-transitory computer-readable medium which comprises instructions that, when executed by one or more processors, cause the one or more processors to perform an embodiment of the method as disclosed in the present invention.

Advantages of the Present Invention

In view of the discussions and descriptions above, along with the results shown, it is evident that the present invention has considerable advantages over the solutions disclosed in the prior-art.

The data augmentation approach in accordance with the present invention provides a method, system and means for creating augmented datasets that are more representative of real-world signals. This is especially useful for the cases in which domain knowledge or a-priori understanding of the physical mechanism behind data creation are not available. More specifically, the present invention may serve as a middle-ground solution between being too specific vs. being too generic when performing data augmentation.

For instance, although both the present invention and Schwabedal et al. propose a data augmentation method based on creating synthetic replicas from a dataset of signals by perturbing their phase spectra, while keeping the magnitude unchanged, this technique (called "surrogate") is modified in the present invention.

That is, Schwabedal et al. uses the default known surrogate method regardless of the characteristics and features of the signal or dataset. Moreover, the choice of which signals or signal segments should undergo the (standard) surrogate creation process depends on domain knowledge i.e., the user needs a-priori understanding of the phenomena in order to transform specific signals or segments presenting the desired signature based on subjective considerations (Schwabedal et al. is primarily focused on alleviating the class imbalance problem in applications involving biomedical signals). The present invention proposes to modify the original surrogate technique, adapting the surrogate creation criteria according to the statistics of the signal dataset, while being agnostic to the domain of application and fully data driven. Furthermore, the modified surrogate technique of this invention can be considered in many different applications, as long as there are signals of any sort involved In addition, WO2021148391 and the present invention both propose a data augmentation method for improving machine learning models based on creating synthetic time series (signals), in which the augmentation is not being carried in the feature space, but in the original signal domain. Also, both methods have a degree of stochasticity involved in generating the augmented data.

Nevertheless, the present invention does not employ generative models to create synthetic time series (or signals) to be used as augmented samples. Also, the technique proposed in WO2021148391 requires prior information about the physical process or domain knowledge to determine the so-called modalities that are characterized by the generative models, while the present invention is completely data-driven and does not require any previous domain knowledge.

Concerning, for example, document US2021073660, both it and the present invention propose data augmentation strategies employing realizations of (pseudo) random processes. However, the present invention is rooted in very different statistical and signal processing concepts, such as identification of relevant frequency bands via spectral coherence, and perturbation of phase spectra via random noise injection in the least relevant spectral bands to a given signal class.

As for document U.S. Pat. No. 9,824,683 compared to the present invention, both propose a data augmentation method for improving the machine learning model that aims at controlling the tradeoff between under/over-specification when augmenting signal samples. In spite of this, the method of the present invention may be applied to any kind of signal or time series (not only speech or audio signals). Also, the present invention is rooted in substantially different signal processing concepts, not relying on the same techniques as U.S. Pat. No. 9,824,683.

Finally, the paper by Aldrich, although also based on the concept of surrogates, that is, the idea that synthetic versions of the signal can be obtained by injecting noise in the signal phase spectrum, differs from the present invention in that the present invention proposes to inject random noise at specific frequency bands-referred as "DAug bands"-which are the least relevant spectral bands for a given class or group of signals. These least relevant bands are found via spectral coherence metrics. Finally, the proposed invention is concerned with the task of augmenting signals or time series for signal classification purposes, not with signal denoising (as is the case for Aldrich).

In other words, the present invention simplifies the configuration process, by generating augmented data with realist variability while preserving the class separability, demanding little domain knowledge from the user.

As mentioned earlier, in the current state of the art, data augmentation is often applied to the original signal (signal space) or to its features (feature space). If in the signal space, transformations are generally applied to the whole signal and are often too generic (e.g., addition of background noise). If data augmentation is applied in the feature space, the augmented features may not resemble the actual phenomena the signal represents, creating artifacts that are meaningless in the feature space and affecting the model's ability to generalize in face of unseen signal samples obtained in real-world conditions.

In addition, data augmentation that require the computation of the signal spectrum usually only consider its magnitude counterparts, ignoring the phase. Finally, for those augmentation effects that do take into account the information encoded in the phase spectrum, one can observe that the phase data is either taken "as is" or processed as a contiguous, indivisible data block, and no considerations on using the most relevant parts or subsegments of the phase are made.

On the other hand, data augmentation according to the present invention is applied to a sub-space composing the original signal space (the phase space) at specific, preselected frequency points. Thus, augmentation effect applied to sample is less prone to represent meaningless artifacts as the case when data augmentation is applied to the features. Moreover, different from other data augmentation that considers the spectrum of the signal, the proposed transformation considers the phase spectrum in lieu of the magnitude spectrum. The adoption of the phase spectrum to perform data augmentation ensures the generated synthetic samples exhibit some good mathematical properties.

Data augmentation applied to a given signal, in accordance with the present invention, considers the stochastic and spectral characteristics of signals that belong to the same class, or that share some degree of similarity with the current signal being augmented. As a consequence, more assertive synthetic samples can be created via the proposed data augmentation method. In addition, since the augmenting effects (i.e., stochasticity) are being applied only to the phase spectrum, the augmented signal samples tend to resemble more those in the original signal space, which benefits subsequent analysis involving representation and human interpretation. More specifically, augmented samples are band-pass filtered versions of the original signals, whereas the frequency band of the band-pass filters can be determined by analyzing relevant bands of signals belonging to the same class (or signals that share a certain similarity according to some criterion).

In sum, the present invention identifies the frequency bands that are less relevant ("DAug bands") to each class (or group) of signals considered for training a machine learning model, or for unsupervised machine learning tasks (e.g., clustering). These less relevant bands are used as source material for applying random noise (stochasticity) in the phase spectrum, which simulates a collective effect of arbitrary transformations. Thus, resulting in a set of augmented signals which resemble the original signal in a coherent manner.

While various example embodiments have been described above, it should be understood that they have been presented by way of example, and not limitation. It will be apparent to persons skilled in the relevant art(s) that various changes in form and detail can be made therein.

What is claimed is:

1. A method of a computer implemented data-driven data augmentation, comprising:

receiving a sound dataset including a plurality of signals to be processed;

based on the received sound dataset not being previously classified into signal classes, the method further comprises performing a clustering algorithm in the sound dataset to find groups of similar signals and to form a plurality of clusters, wherein each cluster is interpreted as a distinct signal class;

forming a sample dataset by gathering, for each signal class of a plurality of the signal classes, at least two representative sample signals from the same signal class;

applying a discrete Fourier transform (DFT) to each gathered sample signal of the sample dataset to generate a transformed sample signal in a frequency domain for each of the gathered sample signal;

computing frequency parameters of each transformed sample signal to determine, based on a spectral coherence threshold, relevant frequency bands and non-relevant frequency bands, wherein computing frequency parameters comprises estimating an average spectral coherence curve between pairs of transformed sample signals within each distinct signal class, and wherein the spectral coherence threshold is a predetermined value used to partition said average spectral coherence curve into the relevant and non-relevant frequency bands;

generating a set of augmented sample signals by injecting random noise into a phase spectrum of each transformed sample signal, the injecting being limited to regions of the phase spectrum corresponding to the non-relevant frequency bands;

applying an inverse DFT to each of the generated augmented sample signals to convert the augmented sample signals into a time domain, creating augmented sound signals.

2. The method according to claim 1, wherein the injecting noise to the non-relevant frequency bands comprises replacing original phase values of the non-relevant frequency bands by synthetic random white noise, uniformly distributed over $U[-\pi, \pi]$.

3. The method according to claim 1, wherein the applying the inverse DFT further comprises applying a real-number operator to the set of augmented sample signals to ensure a time series in a real numbers domain.

4. The method according to claim 1, wherein determining the relevant frequency bands and the non-relevant frequency bands of the each transformed signal samples comprises:

gathering signals from original sound dataset;

filtering out noisy signals or outliers;

wherein frequency bands above the spectral coherence threshold are classified as deterministic frequency bands and frequency bands below the average spectral coherence threshold are classified as the non-relevant frequency bands and are marked for random noise injection.

5. The method according to claim 1 further comprising:

assessing a validity of the set of augmented sample signals generated to determine whether more augmented sample signals need to be generated.

6. The method according to claim 5, wherein a criteria for assessing the validity of the set of augmented sample signals comprises:

determining whether a minimum number of augmented sample signals was generated, determining whether the augmented sample signals are within a quality threshold, and determining whether the augmented sample signals are within a similarity threshold relative to original signals.

7. The method according to claim 6, wherein the assessing to determine whether more augmented sample signals need to be generated further comprises:

returning to the forming of a sample dataset when the augmented sample signals are outside a quality threshold; and returning to the computing of the frequency parameters of each transformed sample signal when the augmented sample signals are outside a similarity threshold relative to the original signals;

returning to the generating a set of augmented sample signals by injecting random noise into a phase spectrum upon a number of augmented samples being below the minimum number.

8. A system for performing data-driven agnostic data augmentation, comprising:

at least one processor;

a storage medium;

wherein the storage medium comprises instructions that, when executed by the at least one processor, causes the system to perform the method as defined in claim 1.

9. A non-transitory computer readable medium comprising instructions that, when executed by at least one processor, causes the at least one processor to perform the method as defined in claim 1.

* * * * *